United States Patent
Berger et al.

(10) Patent No.: US 10,018,211 B2
(45) Date of Patent: Jul. 10, 2018

(54) BOND STANDOFFS FOR SLIDING POSITIONING OF COMPONENTS IN AN ASSEMBLY

(71) Applicant: GM Global Technology Operations LLC, Detroit, MI (US)

(72) Inventors: Elisabeth J. Berger, Farmington Hills, MI (US); Hamid G. Kia, Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 704 days.

(21) Appl. No.: 14/597,686

(22) Filed: Jan. 15, 2015

(65) Prior Publication Data
US 2015/0224753 A1    Aug. 13, 2015

Related U.S. Application Data

(60) Provisional application No. 61/938,571, filed on Feb. 11, 2014.

(51) Int. Cl.
*B29C 65/48* (2006.01)
*F16B 11/00* (2006.01)
(Continued)

(52) U.S. Cl.
CPC ........ *F16B 11/006* (2013.01); *B29C 65/4835* (2013.01); *B29C 66/1122* (2013.01);
(Continued)

(58) Field of Classification Search
CPC ...................................................... B29C 65/48
(Continued)

(56) References Cited

U.S. PATENT DOCUMENTS 4,141,055 A * 2/1979 Berry .................. H01L 23/5381
174/253
5,968,298 A * 10/1999 Staquet .................. B29C 73/04
156/256

(Continued)

FOREIGN PATENT DOCUMENTS

CN    101274503 A    10/2008
CN    101426614 A    5/2009
(Continued)

OTHER PUBLICATIONS

First Office Action for Chinese Application No. 201510071241.X dated Aug. 31, 2016 with letter from China Patent Agent (H.K.) Ltd.; 6 pages.

*Primary Examiner* — Scott W Dodds
(74) *Attorney, Agent, or Firm* — Harness, Dickey & Pierce, P.L.C.

(57) ABSTRACT

Adhesive bonds may be formed between components (e.g., automotive) by sliding components into position without wiping or removing the uncured adhesive. Here, a first bonding region has an uncured adhesive and a plurality of bond standoffs that is positioned adjacent to a second bonding region. Bond standoffs promote sliding between the first and second components, while substantially retaining the uncured adhesive during the sliding. Bond standoffs can be formed on the surface, for example, by molding or stamping. The first and second bonding regions slide into engagement, followed by applying pressure, heat, and/or energy as needed, to form a solid adhesive bond. Methods of repairing manufactured components (e.g., automotive) are also provided with such techniques, including the ability to slide parts into place without removing the uncured adhesive, using bond standoffs formed as strips of adhesive cured on the substrate component or tacks pinned into a composite substrate component.

19 Claims, 8 Drawing Sheets

(51) Int. Cl.
 *B29C 65/00* (2006.01)
 *B29L 31/30* (2006.01)
(52) U.S. Cl.
 CPC .............. *B29C 66/32* (2013.01); *B29C 66/43* (2013.01); *B29C 66/721* (2013.01); *B29C 66/7212* (2013.01); *B29L 2031/30* (2013.01)
(58) Field of Classification Search
 USPC ........................................................ 156/312
 See application file for complete search history.

(56) References Cited

U.S. PATENT DOCUMENTS

| | | | | |
|---|---|---|---|---|
| 6,168,231 | B1* | 1/2001 | Fielding | B62D 29/043 |
| | | | | 296/191 |
| 6,260,264 | B1* | 7/2001 | Chen | H01L 21/563 |
| | | | | 29/832 |
| 8,641,860 | B2 | 2/2014 | Flores et al. | |
| 2003/0141782 | A1* | 7/2003 | Bader | H01L 21/56 |
| | | | | 310/313 R |
| 2013/0118105 | A1* | 5/2013 | Efros | E04F 15/0215 |
| | | | | 52/391 |
| 2014/0150951 | A1* | 6/2014 | Suzuki | B32B 37/1284 |
| | | | | 156/60 |

FOREIGN PATENT DOCUMENTS

| | | | |
|---|---|---|---|
| CN | 104830242 | A | 8/2015 |
| DE | 102015101711 | A1 | 8/2015 |
| JP | H0578623 | A | 3/1993 |
| JP | 2001328874 | A | 11/2001 |
| JP | 2004075927 | A | 3/2004 |
| JP | 5345239 | B1 | 11/2013 |
| RO | 127650 | A2 | 7/2012 |

\* cited by examiner

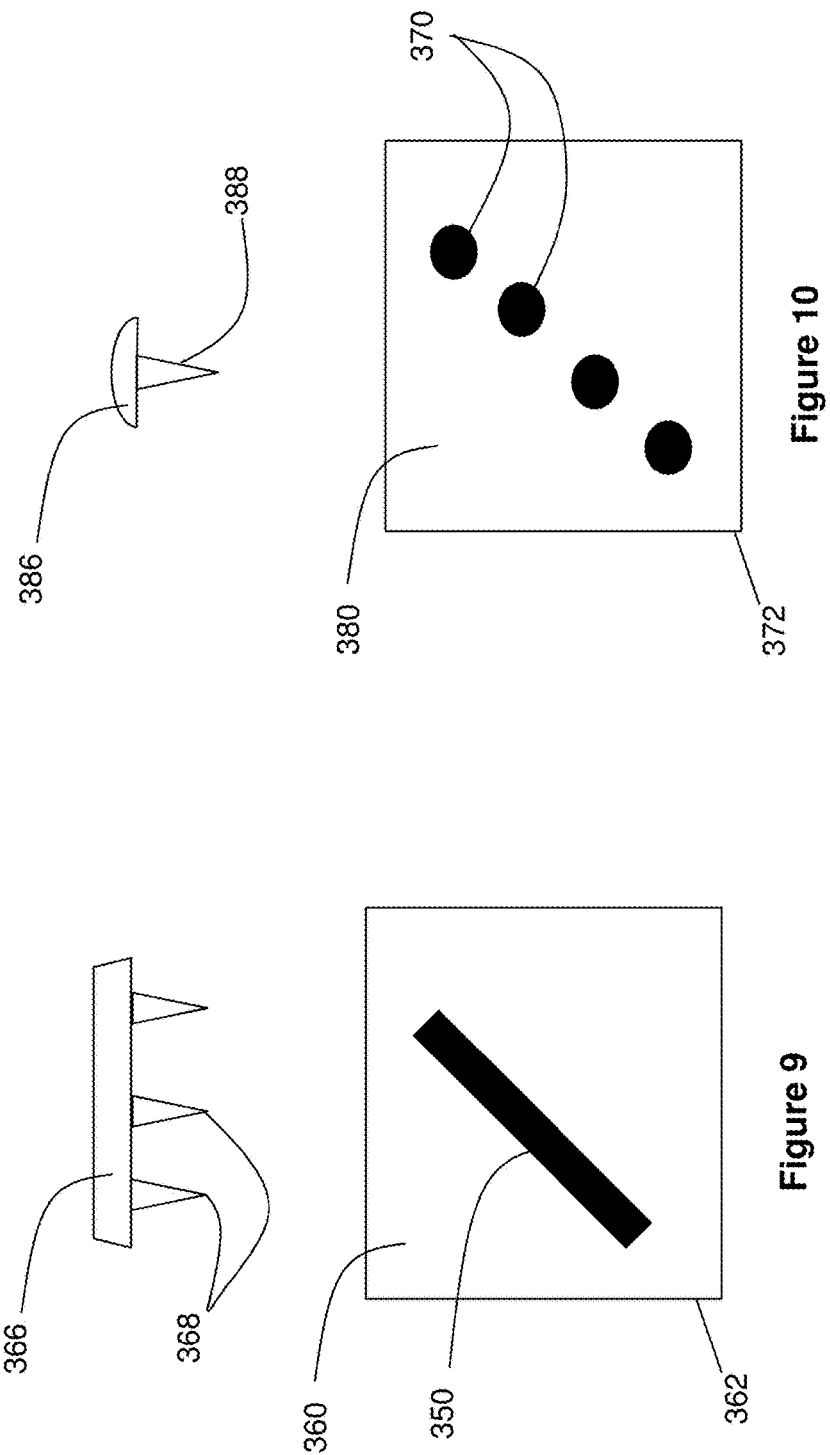

BOND STANDOFFS FOR SLIDING POSITIONING OF COMPONENTS IN AN ASSEMBLY

CROSS-REFERENCE TO RELATED APPLICATIONS

This application claims the benefit of U.S. Provisional Application No. 61/938,571, filed on Feb. 11, 2014. The entire disclosure of the above application is incorporated herein by reference.

FIELD

The present disclosure relates to methods of assembling components by sliding them into position, and more specifically to methods of assembling components, such as automotive components, aerospace components, file storage/cabinets, farm equipment, heavy machinery, household appliances, and consumer electronics, by using assembly standoffs or spacers to permit sliding of structural components into position and then forming an adhesive bond there between.

BACKGROUND

This section provides background information related to the present disclosure which is not necessarily prior art.

The present disclosure pertains to adhesive bonding of manufactured components, such as automotive components, aerospace components, file storage/cabinets, farm equipment, heavy machinery, household appliances, and consumer electronics, by way of non-limiting example. By way of example, automotive body structural components, such as doors, hoods, deck lids, tailgates, vehicle body panels, body frame, and underbody panels are often formed of an assembly of multiple parts, such as complementary panels, that are joined together. Where the panels or other components are both made of stamped metal alloys, the pieces are often welded at their edges. However, when one or both of the panels (or other components) is formed of a composite material, such as a fiber reinforced polymer material, a bead of adhesive is applied to flange surfaces of one or both panels. The panels are positioned with overlying joining surfaces and pressed together and the adhesive cured by heating or other means.

Conventionally, complementary or mating parts that are to be joined together via adhesive bonding are positioned together in a substantially vertical approach or vertical direction (e.g., being dropped or lowered into position onto the complementary component). Thus, at least one of the complementary parts to be joined has the adhesive pre-applied to a bond face (the region to be joined via adhesive bonding and to form the bond line). However, in certain assembly situations, it would be significantly more advantageous to horizontally position and slide parts to be bonded in a horizontal/lateral approach. Such horizontal or lateral sliding may be particularly useful when there is interference with other parts, or because bond faces (regions to be joined via adhesive bonding) are on both the top and bottom of the part. Such situations may arise during initial assembly and formation of a vehicle, but especially during repairs. However, if the parts are brought into contact by sliding in a lateral or horizontal direction, the adhesive is often wiped off the bonding face. Thus, a continuing difficulty occurs in such situations, where assembly is made to be more complicated or repair more extensive and complex, due to constraints on the assembly process due to adhesive bonding limitations. It would be desirable to find new methods of assembling components, such as automotive components, via adhesive bonding that permit sliding in a lateral or horizontal direction to bring components into position and contact with one another for bonding.

SUMMARY

This section provides a general summary of the disclosure, and is not a comprehensive disclosure of its full scope or all of its features.

In various aspects, the present disclosure provides methods of forming an adhesive bond between components. While in preferred aspects, the methods of the present disclosure are directed to forming an adhesive bond between automotive components for automotive assemblies, it should be appreciated that the concepts described herein are not limited to automotive applications, but rather may be broadly applicable to any application. Therefore, for convenience, the present disclosure herein refers to automotive components, but should not be construed to be so limited in all embodiments. In one aspect, a method according to certain aspects of the present disclosure may comprise positioning a first bonding region of a first component adjacent to a second bonding region of a second component. The first bonding region of the first component comprises an uncured polymer, such as an uncured adhesive, and a plurality of bond standoffs that promote sliding between the first component and the second component. The plurality of bond standoffs may be compressible. The method further comprises sliding the first component into engagement with the second component, so that the first bonding region contacts the second bonding region. The plurality of bond standoffs defines a pattern configured to substantially retain the uncured adhesive during the sliding. Finally, once the first bonding region and the second bonding region are in position with the uncured adhesive disposed therebetween, pressure may be applied that initially can serve to slightly compress the plurality of bond standoffs to facilitate wetting out and flow of the uncured adhesive. The method thus comprises applying pressure to the first bonding region and the second bonding region to form a solid adhesive bond between the first component and the second component. In certain variations, heat or energy, as well as pressure, may be applied to the first bonding region and the second bonding region to form the solid adhesive bond.

In other aspects, the present disclosure provides a method of repairing components, such as automotive components, aerospace components, file storage/cabinets, farm equipment, heavy machinery, household appliances, and consumer electronics. Such a method may comprise removing a damaged component from a component assembly that also comprises a second component. In certain aspects, the component assembly may be an automotive component assembly. Then, a first bonding region of a replacement component is positioned adjacent to a second bonding region of the second component. The first bonding region of the replacement component comprises an uncured adhesive and a plurality of bond standoffs that promote sliding between the replacement component and the second component. The plurality of bond standoffs may be compressible. The replacement component can be slid into engagement with the second component, so that the first bonding region contacts the second bonding region. The plurality of bond standoffs defines a pattern configured to substantially retain the uncured adhesive during the sliding. Once the first bonding region and the second bonding region are in position with the uncured adhesive disposed therebetween, pressure is applied to the first bonding region and the second bonding region to form a solid adhesive bond between the replacement component and the second component.

In yet other aspects, the present disclosure provides a method of forming an adhesive bond between automotive polymeric composite components. The method comprises positioning a first bonding region of a first polymeric composite component adjacent to a second bonding region of a second polymeric composite component. The first bonding region of the first polymeric composite component comprises an uncured adhesive and a plurality of bond standoffs that promote sliding between the first polymeric composite component and the second polymeric composite component. The plurality of bond standoffs may be compressible. The first polymeric composite component is slid into engagement with the second polymeric composite component, so that the first bonding region contacts the second bonding region. The plurality of bond standoffs defines a pattern configured to substantially retain the uncured adhesive during the sliding. The pressure is applied to the first bonding region and the second bonding region to form a solid adhesive bond between the first polymeric composite component and the second polymeric composite component.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

FIG. 1A shows an exemplary schematic of complementary automotive panel parts positioned for lateral sliding, where the complementary panels are to be adhered to one another via an adhesive bond.

FIGS. 1B-1D are cross-sectional views taken along lines B-B, C-C, and D-D along the complementary automotive panel parts in FIG. 1A.

FIG. 2A shows an exemplary schematic of complementary automotive panel parts positioned for lateral sliding, where the complementary panels are to be adhered to one another via an adhesive bond in accordance with certain aspects of the present disclosure.

FIGS. 2B-2D are cross-sectional views taken along lines B-B, C-C, and D-D along the complementary automotive panel parts in FIG. 2A.

FIG. 9 shows a detailed schematic of an alternative embodiment according to certain aspects of the present disclosure, where a plurality of bond standoffs is formed on a bonding region of a polymeric composite component to be joined via an adhesive bond. The bond standoffs are formed by pushing or pinning a bar shaped rivet or other mechanical device into the bonding region surface so as to define a pattern configured to substantially retain the uncured adhesive during the sliding.

FIG. 10 shows a detailed schematic of an alternative embodiment according to certain aspects of the present disclosure, where a plurality of bond standoffs is formed on a bonding region of a polymeric composite component to be joined via an adhesive bond by pushing or pinning a round tack/mechanical pin or rivet into the bonding region surface so as to define the pattern configured to substantially retain the uncured adhesive during the sliding.

Corresponding reference numerals indicate corresponding parts throughout the several views of the drawings.

DETAILED DESCRIPTION

Figures 1A, 1B, 1C, 1D:
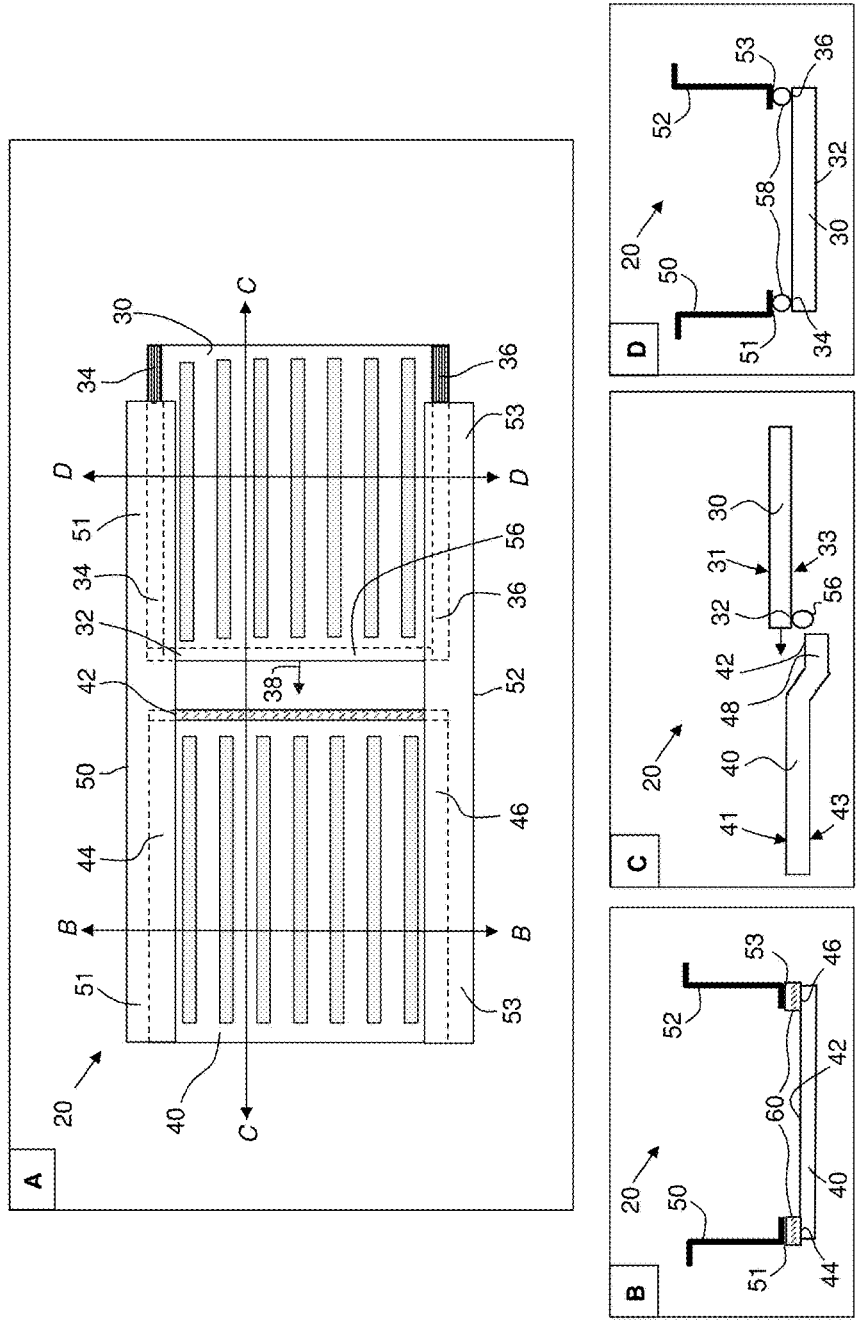
FIGS. 1A-1D.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

Similarly, the use of "substantially" is meant to modify the term with which it appears, so that a small amount of variance in that parameter is permissible in a similar manner to "about" set forth above.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings. Furthermore, the details, examples, embodiments, and preferences provided herein in relation to any particular one or more stated aspects of the present invention, and described and exemplified below in relation to any particular one or more of the stated aspects of the present invention or claims, are combinable with and apply equally to all aspects of the present invention.

The present disclosure pertains to methods for adhesively bonding components together to form an assembly. In certain aspects, the present disclosure pertains to improved methods of repair for component assemblies, such as automotive component assemblies, aerospace component assemblies, file storage/cabinets assemblies, farm equipment assemblies, heavy machinery assemblies, household appliance assemblies, and consumer electronic assemblies. In certain aspects, the methods are used to repair automotive component assemblies. Automotive components may include underbody panels, structural panels, body and frame components, doors, hoods, deck lids, and tailgates, by way of non-limiting example. In certain variations, at least one of the automotive components is formed of a polymeric material, such as a composite material that comprises a polymer and reinforcing material. Many vehicle components are made of sheet molding compound (SMC), bulk molding compound (BMC), or other structural composites. For example, SMC and BMC composites typically comprise a glass fiber reinforced thermosetting polymer composition. However, the uncured polymer such as an uncured polymer matrix or uncured adhesive matrix in various structural composites may include thermoplastics or thermosets, as are well known by those of skill in the art. Suitable polymers include polyesters, such as polystyrenes and polymethylmethacrylate, vinyl esters, epoxies, polyurethanes, polyolefins, such as polypropylene, polyethylene, and the like, polyether ether ketones, polyaryl ether ketones, polyether ether ether ketones, polyamides, polyimides, and any copolymers and combinations thereof, by way of non-limiting example. In certain variations, suitable polymers include polyesters, such as polystyrenes and polymethylmethacrylate, vinyl esters, epoxies, polyurethanes, polyolefins, such as polypropylene, polyethylene, and the like, polyamides, polyimides, and any copolymers and combinations thereof, by way of non-limiting example. Reinforcing materials may include glass fibers, carbon fibers, aramid fibers, natural fibers, such as cellulose, hemp, jute, and the like, and fabrics or random mats made from these fibers, as well as glass, carbon, or mineral particles, such as nanoparticles, by way of non-limiting example. However, the principles of the present disclosure are not limited to polymeric materials, but may also be used where one of more of the components to be joined is a metal or other type of material.

In various aspects, the present disclosure pertains to new methods for adhesively bonding automotive components, where the components to be joined can be slid laterally (or in a horizontal direction) into position for bonding. Thus, in certain aspects, the present disclosure provides a method of sliding two panels or components together for adhesive bonding without wiping the adhesive off a panel or other component. FIGS. 1A-1D provide a simplified illustration of a technique for forming a component assembly 20, such as an automotive underbody panel assembly, having at least one adhesive bond. FIG. 1A includes a first component 30 and a second component 40, which are complementary and shown prior to being joined. First component 30 defines an upper side 31 and a lower side 33. Second component 40 likewise defines an upper side 41 and a lower side 43. In the assembly 20, the first component 30 is desirably slid into position laterally or in a horizontal direction (in other words, slid in the planar direction shown by arrow 38), because a first frame component 50 and a second frame component 52 are disposed over and will ultimately fasten to and retain the first component 30 and the second component 40. First component 30 further comprises a leading terminal edge that defines a first bonding region 32 on lower side 33 of the first component 30. Second component 40 likewise comprises a terminal edge that defines a second bonding region 42 on an upper side 41.

First component 30 also defines a first side bonding region 34 that interfaces with first frame component 50 and a second side bonding region 36 on an opposite side that interfaces with second frame component 52. Second component 40 also defines a first side bonding region 44 that interfaces with first frame component 50 and a second side bonding region 46 on an opposite side that interfaces with second frame component 52. The first frame component 50 defines a first frame bonding region 51 (interfacing with the first side bonding region 34 of the first component 30 and the first side bonding region 44 of the second component 40). The second frame component 52 defines a second frame bonding region 53 (interfacing with the second side bonding region 36 of the first component 30 and the second side bonding region 46 of the second component 40).

In FIGS. 1A-1C, second component 40 has already been joined with or fastened to first frame component 50 and second frame component 52. This joining may be by adhesive bonding, mechanical fastening such as riveting, spot welding if the components are metals, ultrasonic welding if the components are thermoplastic polymers, or any other techniques known to one skilled in the art. These bonding regions (e.g., 32, 34, 36, 42, 44, 46, 51, and 53) provide complementary engaging bonding surfaces for the facing bonding regions that have been (e.g., 44 and 51; 46 and 53) or are to be (e.g., 32 and 42; 34 and 51; 36 and 53) attached with an adhesive bond.

FIG. 1B is a cross-sectional view of a first portion of the assembly 20 (including the second component 40 with first frame component 50 and second frame component 52) taken along line B-B of FIG. 1A. FIG. 1C is a cross-sectional view of the assembly 20 taken along line C-C in FIG. 1A, while FIG. 1D is a cross-sectional view of the assembly 20 taken along line D-D of FIG. 1A showing the first component 30. As can be best seen in FIG. 1C, the second bonding region 42 of the second component 40 is offset from horizontal to define an offset flange 48 that can receive the first bonding region 32 of first component 30 as it is slid into position. Further, it is noted that while the offset flange 48 and second bonding region 42 are below the first bonding region 32, the first frame bonding region 51 of first frame component 50 and the second frame bonding region 53 of second frame component 52 are above the bonding region 32, permitting the first component 30 to be slid into position laterally as opposed to being lowered or raised into position. While the offset flange 48 feature assists with and facilitates sliding engagement of the first component 30 with the second component 40, issues may still remain with the sliding process that may inhibit sliding the assembly, for example, or cause removal of the uncured adhesives during the sliding process (as will be described in greater detail below).

Thus, a first uncured adhesive 56 is disposed in a bead or line formed along the surface of lower side 33 of the first component 30 in the first bonding region 32 as best seen in FIG. 1C. In the adhesive bonding of complementary bonding regions, the uncured adhesive (e.g., 56) may be applied as a bead, strip, band or the like in a suitable pattern to one or both of the surfaces to be bonded. The uncured adhesive is applied on a bonding region surface to achieve a suitably thick layer of uncured adhesive that covers a desired surface area of the bonding regions of the components to be joined. Furthermore, before the uncured adhesives are applied to a bonding region, the surface may be cleaned to improve adhesion. Such cleaning may include by way of non-limiting example, wiping the surface with a solvent like isopropanol or acetone, or by pretreatment cleaning, such as blasting with light sand, scuffing, and/or plasma treating, among others well known to those of skill in the art.

As best seen in FIG. 1D, a second uncured adhesive 58 is likewise disposed along first side bonding region 34 and second side bonding region 36 of first component 30. A third adhesive 60 is disposed along first side bonding region 44 and second side bonding region 46 of second component 40 and, as noted above, is already bonded. Notably, the compositions of the first uncured adhesive 56 and the second uncured adhesive 58 and the already-bonded third adhesive 60 may be the same or different, depending upon the different requirements and materials at each bonding interface.

In some situations, parts or components to be bonded together are most advantageously positioned by sliding. This can be because of interference with other parts or because the bonding regions/bond faces are on both top and bottom of a component. Thus, the first bonding region 32 of the first component 30 and the second bonding region 42 of the second component 40 can be slid into contact or engagement with one another (where the first component 30 is slid in a direction indicated by the arrow) in accordance with various aspects of the present disclosure. As shown in FIG. 1C, where the first bonding region surface 32 is relatively flat and smooth, as in conventional component assemblies, sliding the first component 30 into engagement with the second component 40 may cause the first uncured adhesive 56 to be smeared or wiped off the face of the bonding region 32. This issue may arise even when the second component 40 has the offset flange 48. Also the second uncured adhesive 58 on the first and second side bonding regions 44, 46 may likewise be removed by the sliding action.

Figures 2A, 2B, 2C, 2D:
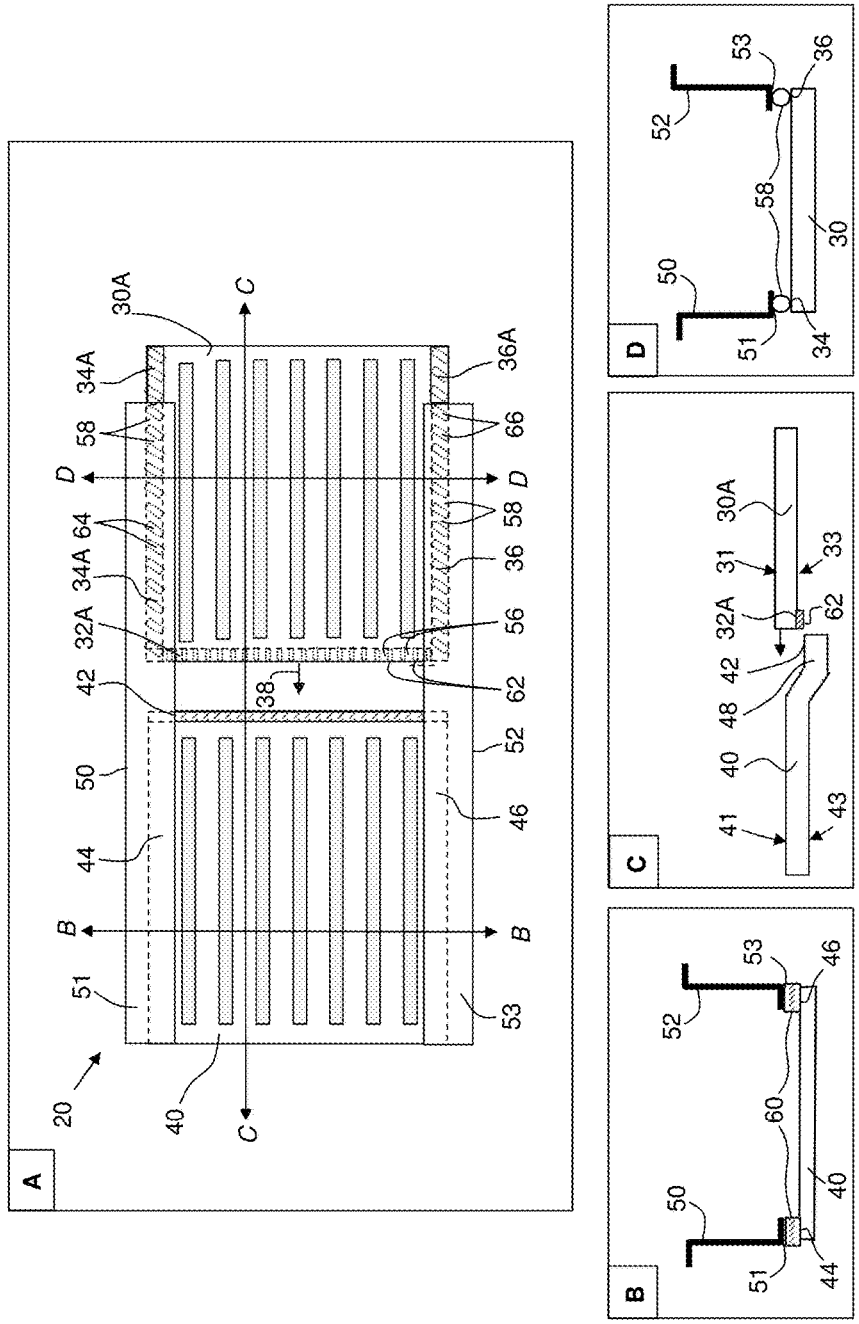
FIGS. 2A-2D.
Figure 3:
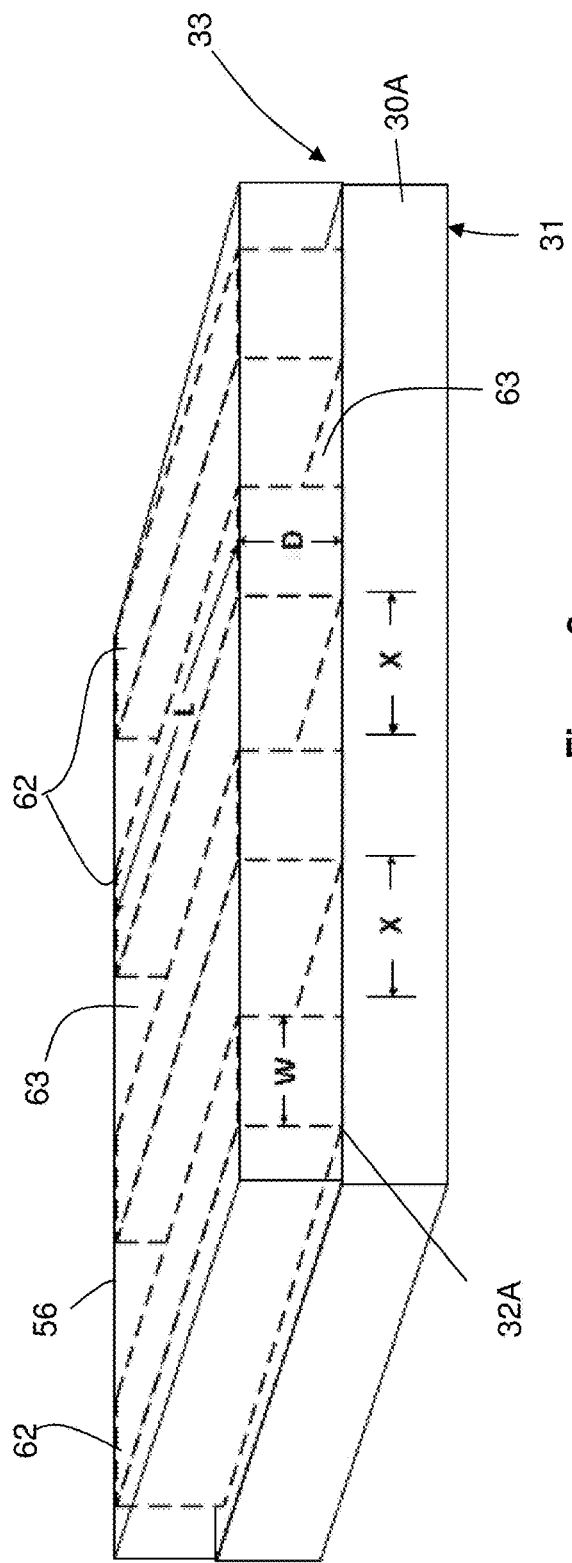
FIG. 3 shows a detailed not-to-scale view for illustrative purposes of an exemplary bonding region of a component to be joined via an adhesive bond in accordance with certain aspects of the present disclosure, where the bonding region comprises a plurality of bond standoffs and an uncured adhesive applied thereto.
Figure 4:
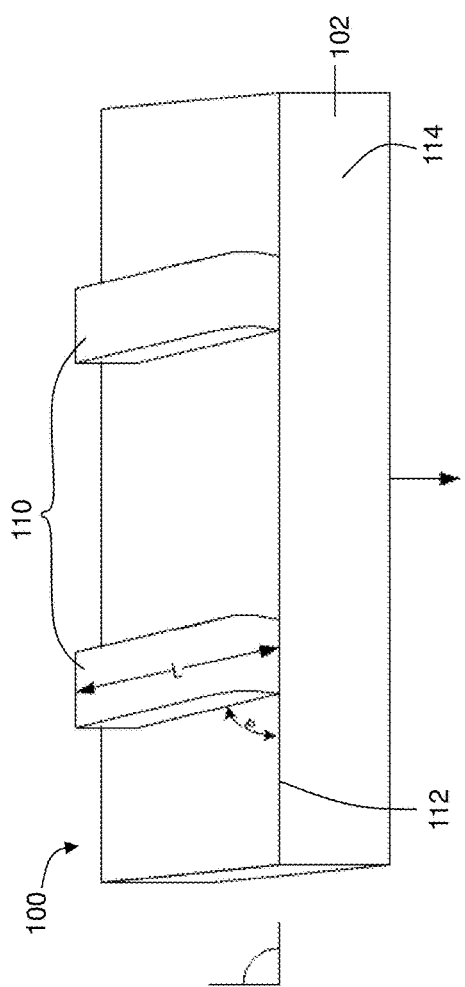
FIG. 4 shows a detailed not-to-scale view for illustrative purposes of one embodiment according to certain aspects of the present disclosure illustrating a bonding region of a component to be joined via an adhesive bond, where the bonding region includes a plurality of bond standoffs in a form of elongate ridge structures. Each elongate ridge structure respectively defines a major longitudinal axis that is positioned to be substantially parallel to a sliding direction of the component and thus perpendicular with respect to a leading edge of the bonding region.
Figure 5:
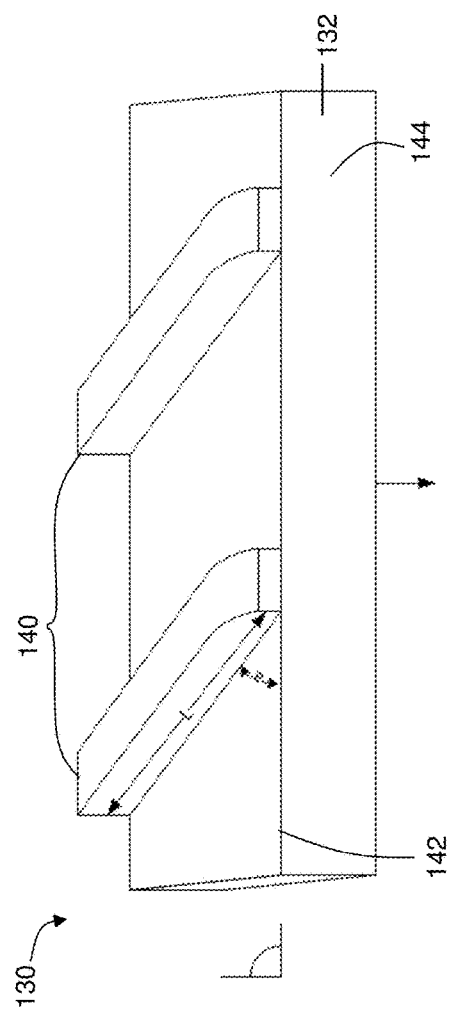
FIG. 5 shows a detailed not-to-scale view for illustrative purposes of one embodiment according to certain aspects of the present disclosure illustrating a bonding region of a component to be joined via an adhesive bond, where the bonding region includes a plurality of bond standoffs in a form of elongate ridge structures. Each elongate ridge structure respectively defines a major longitudinal axis that is positioned at an angle with respect to a sliding direction of the component and thus angled on a diagonal with respect to a leading edge of the bonding region.

Therefore, in accordance with various aspects of the present disclosure, new methods of assembling and forming an adhesive bond between components, such as automotive components, are provided that permit sliding. One such method may comprise positioning a first bonding region of a first component adjacent to a second bonding region of a second component. The ensuing discussion refers to FIGS. 2A-2D and 3, which for brevity use the same reference numbering as in FIGS. 1A-1D for similar components. Thus, a first component 30A comprises a first bonding region 32A. The first bonding region 32A comprises an uncured adhesive 56 and a plurality of bond standoffs 62 that promote sliding between the first component 30A and the second component 40. The plurality of bond standoffs 62 defines a pattern configured to substantially retain the uncured adhesive 56 during the sliding. In this regard, the plurality of bond standoffs 62 maintains a bond height of the uncured adhesive 56. As shown in FIGS. 2A and 3, the bond standoffs 62 are elongate ridge structures that protrude from a surface of the first bonding region 32A. A plurality of channels 63 are formed between each respective bond standoff 62. As discussed further below, the bond standoffs 62 in accordance with various aspects of the present disclosure are protrusions on the surface of the bonding region 32A, but may have a variety of shapes, orientations, and patterns and are not necessarily limited to the preferred variations discussed herein. In certain aspects, the bond standoffs 62 are compressible, so that they can be at slightly compressed when pressure is applied, so as to facilitate flowing and wetting out of the uncured adhesive. FIG. 3 is shown in a reverse orientation from FIG. 2A for ease of viewing of the various features in the bonding region 32A (in FIG. 2A, the bond standoffs 62 and uncured adhesive 56 are disposed on the lower side 33 of first component 30 which has a downward orientation, while FIG. 3 has an opposite upward orientation). Notably, while not shown in FIGS. 2A and 3, in certain variations, bond standoffs have a sloped, curved, or otherwise angled surface profile to further facilitate sliding (as shown in FIGS. 4 and 5).

As shown in FIG. 3, the plurality of elongate ridges 62 is spaced apart at substantially equal intervals (designated by "X"). It should be noted that FIG. 3 and the other figures are not-to-scale and for purposes of illustration may be exaggerated in scale and placement to best show the various features. For example, a ratio of standoff area to uncured adhesive will be less than as shown, where such a ratio may optionally only be 10-20% bond standoff area to uncured adhesive surface area. Each respective elongate ridge structure 62 defines a major longitudinal axis along a length (designated by "L") and has substantially the same dimensions, including a height or depth (designated by "D") and a width (designated by "W"). In certain embodiments, each elongate ridge structure 62 optionally has a width (W) of greater than or equal to about 2 mm to less than or equal to about 25 mm, and in certain aspects, optionally greater than or equal to about 5 mm to less than or equal to about 10 mm. Likewise, each elongate ridge structure 62 optionally has a height (H) of greater than or equal to about 0.2 mm to less than or equal to about 2 mm and in certain aspects, about 1 mm. A length (L) of each elongate ridge structure may optionally be greater than or equal to about 20 mm to less than or equal to about 100 mm, and optionally greater than or equal to about 20 mm to less than or equal to about 50 mm. Such lengths (L) assist with and promote sliding of the second bonding region 42 over the first bonding region 32A.

The distance (X) between each respective elongate ridge structure 62 may be less than or equal to about 100 mm, in certain embodiments. While not shown here, a leading edge of the standoffs may also be rounded or angled in a region where it engages the complementary bonding surface (e.g., second bonding region).

Thus, the first component 30A slides into engagement with the second component 40, so that the first bonding region 32A contacts the second bonding region 42, but the plurality of bond standoffs 62 serve to retain the uncured adhesive 56 within the first bonding region 32A. Conventional bond standoffs are small, molded-in circles formed in a bonding surface, which help control the bond thickness. However, in the context of the present disclosure, the plurality of bond standoffs 62 is formed as protrusions forming a pattern on the surface of the bonding region (e.g., 32A). As noted above, the bond standoffs 62 help retain the precursor adhesive as the components (30A, 40) are slid into position with respect to one another, and thus maintain a bond gap between the first and second bonding surfaces (32A, 42) of the first and second components (30A, 40). Further, the bond standoffs 62 are at least slightly compressible in certain variations, so that they can be compressed to allow the uncured adhesive to flow and wet out. An overall length of the elongate bond standoffs, as well as an optional surface profile, can promote sliding of the first bonding region 32A of first component 30A into engagement with the second bonding region 42 of second component 40.

It should be noted that while not shown, other bonding regions, like second bonding region 42 that mates with first bonding region 32A may also have a plurality of bond standoffs formed therein in accordance with the present teachings. The bond standoffs may be on either the upper or lower surface of the bonding area. While a less preferred variation, both sides may have bond standoffs; however, if both sides of a bonding region have bond standoffs, care must be taken to avoid interference of the upper and lower standoffs. This can be accomplished by making each set substantially half the desired height of the bond thickness or by making sure the standoffs will not overlap.

The present teachings are particularly advantageous for use in a repair setting, where a replacement component can be modified for bonding with another component by including the plurality of bond standoffs. Furthermore, the bonding regions can be tailored to the assembly design with methods of the present disclosure. Notably, the uncured adhesive 56 may be applied in the first bonding region 32A to fill voids between the bond standoffs, followed by leveling, smoothing, and/or shimming of the uncured adhesive to a desired thickness (for example, by applying a planar surface or doctor blade over the plurality of bond standoffs). The uncured adhesive 56 may be leveled to cover the upper surfaces of the bond standoffs 62 or may be leveled to fill only the channels 63 defined between elongate ridges of the bond standoffs 62 (as shown in FIG. 3).

First component 30 also defines optional modifications to a first side bonding region 34A that interfaces with the first frame bonding region 51 of first frame component 50 and a second side bonding region 36A on an opposite side that interfaces with the second frame bonding region 53 of the second frame component 52. First side bonding region 34A contains a second plurality of bond standoffs 64 in the form of elongate ridges that are angled with respect to the sliding direction, while second side bonding region 36A likewise contains a third plurality of bond standoffs 66 in the form of elongate ridges that are angled with respect to the sliding direction. In this regard, the second plurality of bond standoffs 64 and the third plurality of bond standoffs 66 retain second uncured adhesive 58 within the first side bonding region 34A or second side bonding region 36A. Because the second plurality of bond standoffs 64 and the third plurality of bond standoffs 66 are formed in a pattern that is offset at an angle with respect to the direction of sliding (indicated by the arrow) of the first component 30A, this further helps to retain the second uncured adhesive 58 during the lateral/horizontal sliding of the first component 30A into engagement with the second component 40.

After the respective components are slid together and positioned for forming one or more adhesive bonds (not shown), pressure is applied to the first bonding region 32A of the first component 30 and the second bonding region 42 of the second component 42A to form a solid adhesive bond between the first component 30A and the second component 42. In certain variations, heat or other energy may also be applied concurrently with pressure, to facilitate curing or solidification of the bond. Therefore, after the uncured adhesive(s) are applied to at least one or more bonding regions (32A, 34A, or 36A) of the first component 30A panel, the first component 30A and the second component 40 are slid together into position and then pressed together by applying pressure against the uncured adhesive. This process may further include heating or otherwise applying energy to polymerize or cure the polymeric composition to form a strong adhesive bond there between.

Thermoset adhesive may be cured at room temperature or elevated temperatures, as well as by other methods of supplying energy such as electron beam cure. Thermoplastic (hot melt) adhesive curing is typically by cooling. For a complex bond such as these, thermosets are most suitable, although thermoplastics can also be used. Where the first side bonding region 34A and the second side bonding region 36A have uncured adhesive 58 in accordance with certain aspects of the present teachings, adhesive bonds may likewise be formed concurrently by applying pressure, and optionally heat in certain aspects, to form additional adhesive bonds between first frame component 50 and first component 30A and second frame component 52 and first component 30A. In certain variations, pressure may be applied to the bonding regions by clamps, vices, applying weight to the region, or fully fixed matched tooling (e.g., matched metal or plastic tooling). Heat may be applied via localized heating in the region (e.g., via a heat gun or heated fixtures) or by exposing or placing the components in a region having an elevated temperature (e.g., in an oven or furnace).

Suitable non-limiting adhesives for the first uncured adhesive 56 and the second uncured adhesive 58 may be known adhesive compositions for such applications, including hot-melt adhesives, like polyamides or some urethanes and polyesters, or thermoset adhesives like acrylates and methacrylates (e.g., polymethylmethacrylates), epoxies and certain polyesters, copolymers and combinations thereof. Notably, the first and second uncured adhesives 56, 58, as well as the third adhesive 60, may be the same composition or different compositions. For example, the adhesive composition may be initially prepared in one-part or two-part formulations depending on a shelf life of the precursor before it is used in a bonding operation, among other considerations. Such uncured adhesive formulations can typically contain viscous, but mobile liquids, which are curable to a strong adherent interfacial bond layer between surfaces of complementary or mating components to be joined to form an assembly. The uncured adhesive formulations may contain other components, such as catalysts or polymerization aids, or additives for prolonging storage time. The uncured adhesive formulations may contain other additives, like solid particles, fillers, or materials for coloring.

Thus, in certain aspects, the present disclosure contemplates a method of forming an adhesive bond between automotive components. Such a method may comprise positioning a first bonding region of a first component adjacent to a second bonding region of a second component. The first bonding region of the first component comprises an uncured adhesive and a plurality of bond standoffs that promote sliding between the first component and the second component. By promoting sliding, it is meant that the surface of the bond standoffs is either a relatively low friction surface (after partial or full curing) and/or that at least a portion of the protruding bond standoff is shaped or sloped to promote sliding of the first component as it engages with the second component, for example, where a leading edge may have a curved or rounded profile to enhance sliding capability and/or to promote smooth engagement. The method further comprises sliding the first component into engagement with the second component. Notably, the sliding can occur in a lateral direction where the major surfaces of the first component and second component are parallel to one another, as discussed previously above. The first bonding region contacts the second bonding region and the plurality of bond standoffs defines a pattern configured to substantially retain the uncured adhesive during the sliding. In certain aspects, the bond standoffs are at least slightly compressible and thus can be compressed to allow the uncured adhesive to flow and wet out. Next, the method comprises applying at least one of heat and pressure to the first bonding region and the second bonding region to form a solid adhesive bond between the first component and the second component. It may also be necessary to add heat or other means of curing (e.g., for a thermoset adhesive), or hold the bonding assembly at room temperature according to the cure requirements dictated by the adhesive chemistry. Thus, in various aspects, the present teachings provide the ability to position two parts or assemblies for an adhesive bond by sliding them together, instead of having to bring the components together vertically.

In certain aspects, the pattern comprises a plurality of elongate ridge structures each having substantially the same length and substantially the same distance between each respective elongate structure. In certain other aspects, the plurality of elongate ridge structures each respectively defines a major longitudinal axis that is positioned to be substantially parallel to a sliding direction of the first component. In certain variations, the plurality of elongate ridge structures respectively define a major longitudinal axis that is positioned perpendicularly with respect to a leading edge of the first bonding surface (as in FIG. 4) or alternatively positioned diagonally with respect to a leading edge of the first bonding surface (as in FIG. 5) and thus offset at an angle with respect to the sliding direction.

In FIG. 4, a bonding region 100 of a first component 102 comprises a plurality of elongate ridge structures 110 (a simplified version showing only two elongate ridge structures 110 is shown for illustration). In FIG. 4, an uncured adhesive has not yet been applied. Each respective elongate ridge structure 110 defines a major elongate axis along length designated "L." A direction in which the first component 102 slides is also shown by a directional arrow. A leading edge 112 of the first component 102 along terminal face 114 slides into engagement with a complementary component (not shown). Notably, the each elongate ridge structure 110 has a sloped or angled surface profile along the leading edge 112 to promote sliding and engagement with a complementary component. As can be seen in FIG. 4, a major elongate axis L defines an angle (designated "a") with respect to the leading edge 112, which in FIG. 4 is substantially perpendicular to the leading edge (meaning that the orientation of the major axes of the elongate ridge structures 110 are parallel to a sliding direction on the first component 102). Thus, in FIG. 4, the angle "a" is approximately 90°.

In FIG. 5, a bonding region 130 of a first component 132 comprises a plurality of elongate ridge structures 140 (again, a simplified version showing only two elongate ridge structures 140 is shown for illustration). In FIG. 5, an uncured adhesive has not yet been applied. Each respective elongate ridge structure 140 defines a major elongate axis along length designated "L." A direction in which the first component 132 slides is also shown by a directional arrow. A leading edge 142 of the first component 132 along terminal face 144 slides into engagement with a complementary component (not shown). Notably, the each elongate ridge structure 140 has a sloped or angled surface profile along the leading edge 142. As can be seen in FIG. 5 and like in FIG. 4, a major elongate axis L defines an angle (designated "a") with respect to the leading edge 142, which in FIG. 5 is offset at an angle from the leading edge 142. As such, the orientation of the major axes of the elongate ridge structures 140 is offset at a diagonal orientation to the sliding direction on the first component 132. In FIG. 5, the angle "a" is less than 90°, for example, about 45°.

Figure 6:
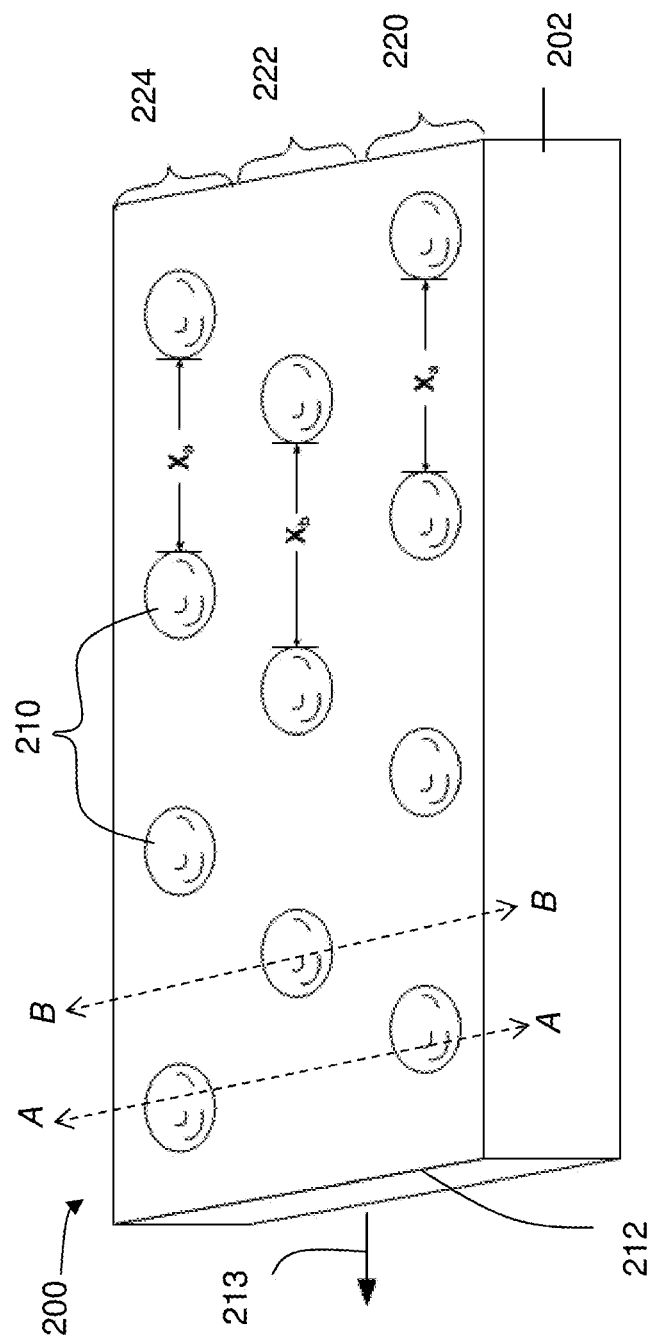
FIG. 6 shows a detailed not-to-scale view for illustrative purposes of another embodiment according to certain aspects of the present disclosure illustrating a bonding region of a component to be joined via an adhesive bond. A plurality of bond standoffs are provided on the bonding region in a form of round protrusions or dots that create a pattern that comprises a plurality of rows of discrete round protrusions spaced at predefined intervals.

FIG. 6 shows an alternative embodiment of a bonding region 200 of a component 202 to be joined to another complementary component (not shown). The component 202 comprises a plurality of bond standoffs in the form of round protrusions or dots 210. A direction in which the component 202 slides is shown by a directional arrow 213. A terminal edge 212 of the component 202 will slide into engagement with a complementary component to form an assembly having an adhesive bond. Such a bonding region 200 is similar to side bonding regions (e.g., 34A, 36A) shown in FIG. 2A. The plurality of round protrusions 210 define a pattern that comprises a plurality of rows 220, 222, 224 spaced at predefined intervals (designated "$X_a$" for rows 220 and 224 and "$X_b$" for row 222). Notably, the predefined intervals may be the same for each row in FIG. 6, but also may vary between different rows in alternative designs. A first row 220 of the plurality of round protrusions 210 has a first position (designated by a center line "A" extending through a center of a round protrusion 210), while a second row 222 of the plurality of round protrusions 210 has a second position (designated by a center line "B" extending through a center of a round protrusion 210) that is offset with respect to the second position A. Likewise, a third row 224 of the plurality of round protrusions 210 has a third position (shown as center line "A" extending through a center of a round protrusion 210) that is offset from the second position. The third position A corresponds to the first position A, but in alternative embodiments multiple different positions are likewise contemplated. In such a pattern, a line of continuous contact with a planar component may be established when such a planar component is swept across the bonding region 200 (for example, to fill it with an uncured adhesive) as it progresses in the sliding direction.

Figure 7:
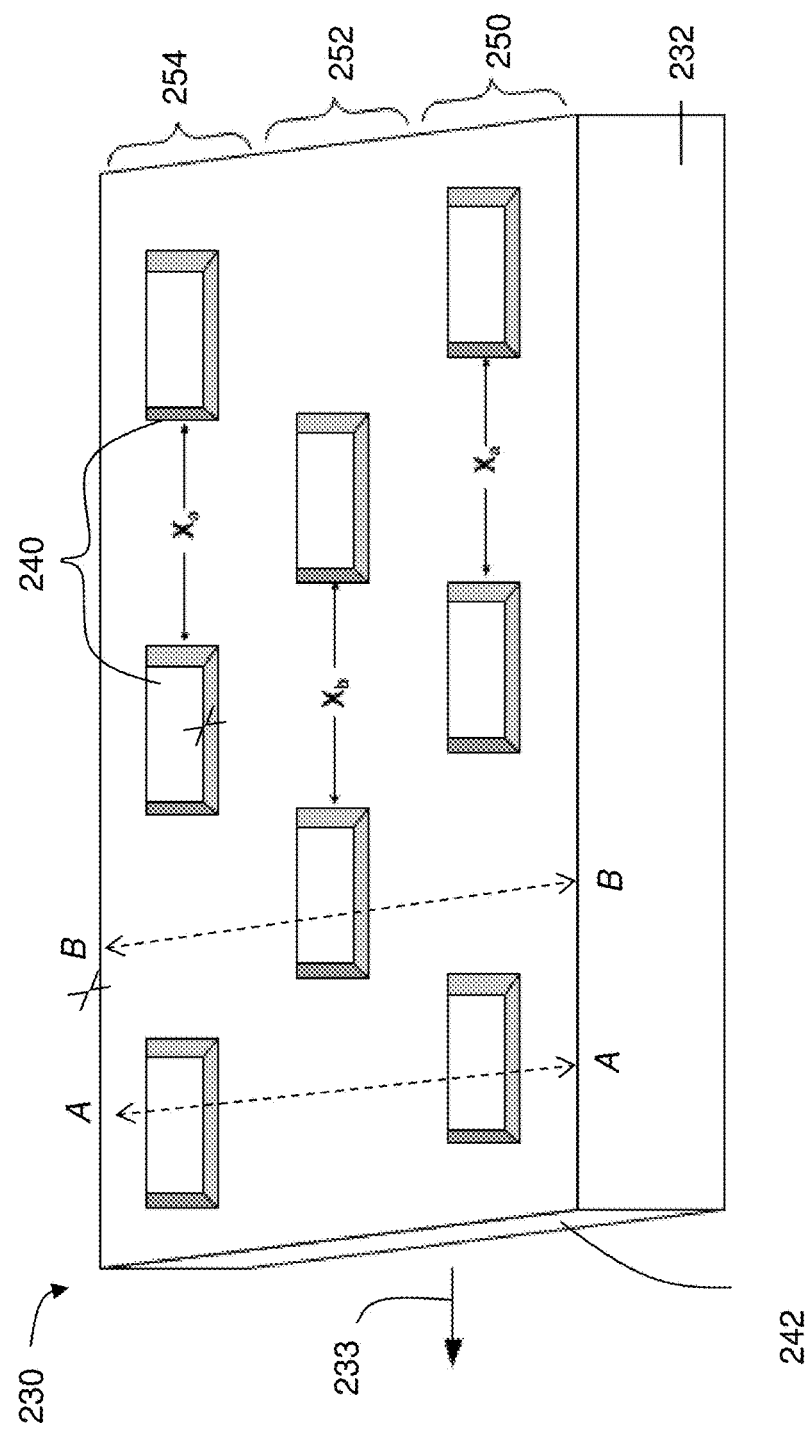
FIG. 7 shows a detailed not-to-scale view for illustrative purposes of another embodiment according to certain aspects of the present disclosure illustrating a bonding region of a component to be joined via an adhesive bond comprising a plurality of bond standoffs in a form of discrete elongate ridge structures forming a pattern of rows, where the discrete elongate ridge structures are spaced at predefined intervals.

FIG. 7 shows yet another alternative embodiment of a bonding region 230 of a component 232 to be joined to another complementary component (not shown). The component 232 comprises a plurality of bond standoffs in the form of discrete elongate beveled ridge structures 240. As shown, the beveled ridge structures 240 have beveled or angled surfaces that serve to promote sliding. A direction in which the component 232 slides is shown by a directional arrow 233. A terminal edge 242 of the component 232 will slide into engagement with a complementary component to form an assembly having an adhesive bond. Such a bonding region 230 is similar to side bonding regions (e.g., 34A, 36A) shown in FIG. 2A.

The plurality of beveled ridge structures 240 define a pattern that comprises a plurality of rows 250, 252, 254 spaced at predefined intervals (designated "$X_a$" for rows 250 and 254 and "$X_b$" for row 252). Notably, in certain aspects, the predefined intervals are the same for each row in FIG. 7, but may also vary between different rows in alternative designs. A first row 250 of the plurality of beveled ridge structures 240 has a first position (designated by a center line "A" extending through a center of a beveled ridge structure 240), while a second row 252 of the plurality of beveled ridge structures 240 has a second position (designated by a center line "B" extending through a center of a beveled ridge structure 240) that is offset with respect to the second position A. Likewise, a third row 254 of the plurality of elongate beveled ridge structures 240 has a third position a (shown as center line "A" extending through a center of a beveled ridge structure 240) that is offset from the second position. The third position A corresponds to the first position A, but in alternative embodiments multiple different positions are likewise contemplated. In such a pattern, a line of continuous contact with an overhead planar component may be established when such a planar component is swept across the bonding region 230 (for example, to fill it with an uncured adhesive) as it progresses in the sliding direction.

In certain aspects, the present disclosure also contemplates methods of forming the plurality of bond standoffs before sliding the components into position. Thus, in certain aspects, the methods of the present disclosure may comprise applying an uncured polymer to a first bonding region of a first component to define a pattern. After the applying, such an uncured polymer can be partially or fully cured to form the plurality of bond standoffs. After curing or partially curing, additional adhesive (which may be of the same composition as the uncured polymer, but also may be might be of a different composition) is added and then skimmed with a straight edge to the appropriate thickness, using the bond standoffs as thickness guides. Thus, instead of molding the standoffs into the part during manufacturing, which may make the molding process more complex, in certain variations, such bond standoffs can be formed of a polymer, then cured or partially cured depending on adhesive chemistry, followed by use to assemble the components/parts together via an adhesive bond.

Figure 8:
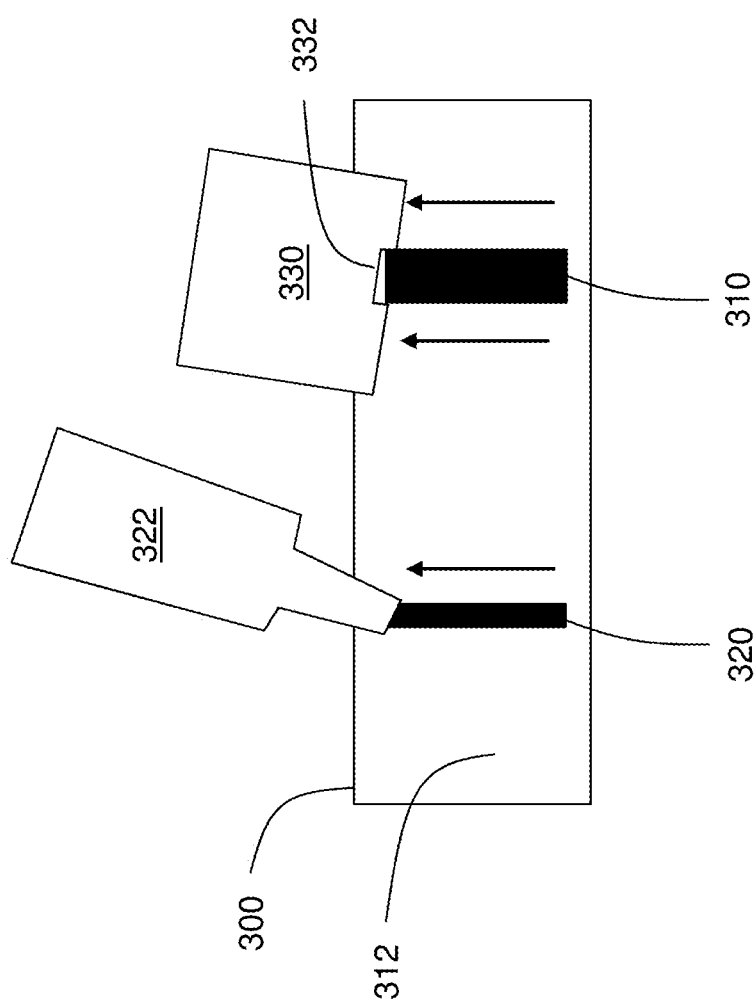
FIG. 8 illustrates a schematic of a method of forming a plurality of bond standoffs on a component to be joined via an adhesive bond, where an uncured polymer, which may be an adhesive, is applied to a bonding region of the component to define a pattern, followed by shaping of the uncured polymer with a tool having a predetermined shape over the uncured polymer according to certain variations of the present disclosure.

FIG. 8 illustrates forming a bond standoff 310 formed on a component 300 to be joined via an adhesive bond (not shown). An uncured polymer 320 is applied as an elongated bead by an applicator 322 to a surface bonding region 312 of the component 300. After the uncured polymer 320 is applied to the surface bonding region 312, a tool 330 can be used for scraping the uncured polymer 320 to a proper thickness and/or to further shape the uncured polymer 320 into a desired shape for the bonding standoff 310. While the tool 330 may have a flat or planar lower surface for regulating uncured polymer 320 thicknesses (not shown), in certain variations, like that shown in FIG. 8, the lower surface of tool 330 has an opening that defines a shaped region 332. When the tool 330 is scraped over the uncured polymer 320 on surface bonding region 312, the shaped region 332 creates a corresponding complementary shape into the uncured polymer 320 and thus creates a bonding standoff 310 having desired dimensions and shape.

As will be appreciated by those of skill of art, a variety of different shapes can be used in the shaped region 332 of tool 330 and it is not limited to the rectangular shape shown in FIG. 8. Furthermore, in certain variations, the shaped region 332 can be applied at different angles over the length of the uncured polymer 320, so that it may have a more rounded and smooth profile along one end to facilitate sliding (e.g., along a sloped leading edge of the elongate ridge structure). Thus, by repeating the process of applying the uncured polymer 320 in a plurality of rows on the surface bonding region 312, followed by shaping of the uncured polymer 320 with the tool, a pattern of bonding standoffs may be formed according to certain variations of the present disclosure. Notably, a shaping tool is not necessary, but in certain variations may assist in forming bond standoffs with a desired predetermined shape and uniform thickness.

As noted above, the uncured polymer may be of the same or different composition from the adhesive polymer. Suitable polymers to form the bond standoffs may be selected from a group consisting of: polyolefins, such as polypropylene, polyethylene, and the like, polyamides, polyimides, polyesters, such as polystyrenes or polymethylmethacrylate, vinyl esters, epoxies, urethanes, and any copolymers and combinations thereof. Partial or full curing conditions are well known to those of skill in the art. In certain aspects, other additives may be included with the uncured polymer, for example reinforcing fillers such as calcium carbonate, talc, or milled glass fibers, or other additives such as coloring agents or catalysts.

In certain other aspects, the present disclosure contemplates alternative methods of forming the plurality of bond standoffs before sliding the components into position. In certain aspects, such a method may form the plurality of bond standoffs by pinning or otherwise partially embedding a bond standoff into a component. Such a component comprises a polymeric material like a composite material. In other variations, the component comprises a metal. Other suitable materials may include natural materials, like wood. Suitable exemplary bond standoffs may include tacks, rivets, or other types of structures with points that can be pushed into the component surface to form an adhered standoff. Such bond standoffs may be formed of materials like metal or plastic, by way of example. As noted above, in certain aspects, the bond standoffs may exhibit at least a slight amount of compressibility. Such standoffs may be in the shape of bars or oblong/elongate shapes, which can act to facilitate sliding. Rows of rounded structures are also contemplated.

Thus, in certain aspects, the methods of the present disclosure may be used for forming an adhesive bond between a first component and a second component, where at least one of the first component and the second component comprises a polymeric composite material. In certain variations, both of the first component and second component may be formed of a polymeric material, such as a composite material. In other aspects, at least one of the first component and the second component comprises a metal material and optionally each of the first and second components may be formed of a metal. Such methods may include first forming the plurality of bond standoffs by attaching or affixing bond standoffs onto or into the first or second components, so as to define the pattern configured to substantially retain the uncured adhesive during the sliding. Where two metal components are joined, rivets may be used or adhesive strips to form the bond standoffs, by way of example.

FIG. 9 shows a schematic of one such method, where a bond standoff 350 is created on a bonding region 360 of a polymeric composite component 362 to be joined via an adhesive bond. In such an embodiment, a beveled bar shaped tack 366 comprises a plurality of pins 368. The pins 368 can be pushed, pinned, hammered or otherwise embedded into or attached on the bonding region 360 surface. Where a plurality of such bond standoffs 350 are fastened to the surface, they define a pattern configured to substantially retain an uncured adhesive during sliding. For example, such a pattern may be similar to that shown in FIGS. 4-5 and 7, by way of non-limiting illustration.

In certain aspects, yet another method of forming a plurality of bond standoffs by pinning a bond standoff into a component is contemplated. FIG. 10 shows a detailed schematic of another such method, where a plurality of bond standoffs 370 is created on a bonding region 380 of a polymeric composite component 372 to be joined with a complementary component surface (not shown) via an adhesive bond. In such an embodiment, a round protrusion tack 386 comprises a pin 388. The pin 388 can be pushed, pinned, hammered or otherwise embedded into the bonding region 380 surface, so that a portion of the round protrusion tack 386 is partially embedded in the polymeric composite component 382 and a portion partially exposed. Where a plurality of such bond standoffs 370 are fastened to the bonding region surface 380 surface, they define a pattern configured to substantially retain an uncured adhesive during sliding. For example, such a pattern may be similar to that shown in FIG. 6, by way of non-limiting illustration.

The concepts of the present disclosure are particularly advantageous for use in methods of replacing parts, which are not originally manufactured with molded standoffs. Repair and replacement of components within an assembly can be particularly challenging, whether because of difficult re-assembly positioning or ability to control bond gap (as the parts were not originally bonded, e.g., being originally ultrasonically welded). In a repair shop, an uncured polymer, such as adhesive, can be applied by machine or by a technician in a predetermined pattern, then formed to the proper thickness with a simple tool. The uncured polymer can be cured or partially cured to form the bond standoffs. Then, additional adhesive (which can be the same type, but also may be a different but compatible type) is added and skimmed to the appropriate thickness with a straight edge, using the bonded standoffs as thickness guides.

Thus in certain other aspects, a method of repairing components, such as automotive components, is provided. Such a method may comprise first removing a damaged component from an automotive component assembly that also comprises a second component. As noted above, the first bonding region or the second bonding region can optionally be cleaned prior to applying uncured adhesive to improve strength of the adhesive bond, which may be particularly desirable for a repair on an automobile that has been exposed to service conditions. The method thus positions a first bonding region of a replacement component adjacent to a second bonding region of the second component. The first bonding region of the replacement component comprises an uncured adhesive and a plurality of bond standoffs that promote sliding between the replacement component and the second component. The replacement component can thus be slid into engagement with the second component, so that the first bonding region contacts the second bonding region. The plurality of bond standoffs defines a pattern configured to substantially retain the uncured adhesive during the sliding. The method also comprises applying pressure, and optionally applying both heat and pressure, to the first bonding region and the second bonding region to form a solid adhesive bond between the replacement component and the second component. The applying of pressure in a repair context may require supporting the assembly on a surface or structure beneath the components to be bonded (e.g., on a sawhorse, work bench, or other repair support structure), followed by applying pressure or weight to the area to be bonded. For example, sandbags or other weighted materials may be applied over the assembly during the period that the uncured adhesive is curing. Because of the bond standoffs introduced into the bonding regions, the bond will maintain an appropriate thickness as it cures. Although a room temperature cure is preferred in certain embodiments, in some cases heat may be needed for cure, depending on the adhesive used. If this is the case, a heat gun may be used, or depending on the situation, the part may be placed in an oven. Alternatively, other heat-inducing processes such as induction heating or infrared heating may be used.

In certain aspects, such a method of repairing automotive components may further include forming the plurality of bond standoffs, by applying an uncured polymer to the first bonding region of the replacement component to define the pattern, followed by partial or full curing to form the plurality of bond standoffs. After the applying of the uncured polymer to the surface of the first bonding region, the uncured polymer may optionally be shaped with a tool having a predetermined shape (e.g., by scraping the tool over the uncured polymer). In other aspects, the method further comprises first applying the uncured adhesive to the first bonding region of the replacement component; and leveling the applied uncured adhesive between the plurality of bond standoffs within the first bonding region. Such leveling may be done with a straight edge tool. In certain embodiments, at least one of the replacement component or second component comprises a polymeric composite material, and in certain variations, preferably both may comprise a polymeric composite material. In alternative embodiments, the replacement component may comprise other materials in which the bond standoffs can be embedded, like wood. As noted previously, the techniques and methods provided by the present disclosure pertain not only to automotive applications in preferred variations, but in alternative variations may also be used for any part or component assemblies in a variety of different fields. Alternatively, metal components can have metal rivets used to form bond standoffs. In certain other variations, the replacement component comprises a polymeric composite material and the method may further comprise first forming the plurality of bond standoffs by pinning bond standoff tacks into polymeric composite material so as to define the pattern configured to substantially retain the uncured adhesive during the sliding.

In this regard, the parts to be adhesively bonded in an assembly are capable of being positioned by the most advantageous method, namely lateral sliding, while substantially avoiding uncured adhesive from being wiped off or otherwise removed from the bonding face. Thus, the present teachings provide various options for assembly methodologies of components, such as automotive components, including enabling the use of adhesive on an upper or top side of one edge, and on a bottom or lower side of an adjacent edge. Such methods are particularly helpful for repair assembly. Moreover, the principles of the present disclosure enable more complex assembly schemes for successfully bonding part assemblies and repair part assemblies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming an adhesive bond between automotive structural components, the method comprising:
   positioning a first bonding region of a first automotive structural component adjacent to a second bonding region of a second automotive structural component, wherein the first bonding region of the first automotive structural component comprises an uncured adhesive and a plurality of bond standoffs that promote sliding between the first automotive structural component and the second automotive structural component, wherein the plurality of bond standoffs is compressible;
   laterally sliding the first automotive structural component into engagement with the second automotive structural component, so that the first bonding region contacts the second bonding region, wherein the plurality of bond standoffs defines a pattern configured to substantially retain the uncured adhesive during the sliding; and
   applying pressure to the first bonding region and the second bonding region to form a solid adhesive bond between the first automotive structural component and the second automotive structural component.

2. The method of claim 1, further comprising first forming the plurality of bond standoffs by applying an uncured polymer to the first bonding region of the first automotive structural component to define the pattern, followed by partial or full curing to form the plurality of bond standoffs.

3. The method of claim 2, wherein after the applying of the uncured polymer to the first bonding region, shaping the uncured polymer with a tool having a predetermined shape.

4. The method of claim 1, wherein the pattern comprises a plurality of elongate ridge structures each having substantially the same length and substantially the same distance between each respective elongate ridge structure.

5. The method of claim 4, wherein each elongate ridge structure has a width of greater than or equal to about 2 mm to less than or equal to about 25 mm, a height of greater than or equal to about 0.2 mm to less than or equal to about 2 mm, a length of greater than or equal to about 20 mm to less than or equal to about 100 mm, and a distance between each respective elongate ridge structure is less than or equal to about 100 mm.

6. The method of claim 1, wherein the pattern comprises a plurality of rows of discrete elongate ridge structures spaced at predefined intervals, wherein a first row of the plurality of rows has a first position and a second row of the plurality of rows has a second position that is offset with respect to the first position.

7. The method of claim 1, wherein the pattern comprises a plurality of rows of discrete round protrusions spaced at predefined intervals, wherein a first row of the plurality of rows has a first position and a second row of the plurality of rows has a second position that is offset with respect to the first position.

8. The method of claim 1, further comprising first applying the uncured adhesive to the first bonding region of the first automotive structural component; and leveling the applied uncured adhesive between the plurality of bond standoffs within the first bonding region.

9. The method of claim 1, wherein one of the first bonding region and the second bonding region defines an offset flange that receives the other of the first bonding region or the second bonding region.

10. The method of claim 1, wherein at least one of the first automotive structural component or the second automotive structural component comprises a polymeric composite material.

11. The method of claim 1, further comprising first forming the plurality of bond standoffs by attaching bond standoffs on the first automotive structural component as to define the pattern configured to substantially retain the uncured adhesive during the sliding.

12. The method of claim 1, wherein the first automotive structural component further comprises at least one additional bonding region in addition to the first bonding region, wherein the at least one additional bonding region also comprises an uncured adhesive and a plurality of bond standoffs that promote sliding between the first automotive structural component and another automotive structural component.

13. A method of repairing automotive structural components, comprising:
    removing a damaged component from an automotive component assembly that also comprises a second component;
    positioning a first bonding region of a replacement component adjacent to a second bonding region of the second component, wherein the first bonding region of the replacement component comprises an uncured adhesive and a plurality of bond standoffs that promote sliding between the replacement component and the second component, wherein the plurality of bond standoffs is compressible;
    laterally sliding the replacement component into engagement with the second component, so that the first bonding region contacts the second bonding region, wherein the plurality of bond standoffs defines a pattern configured to substantially retain the uncured adhesive during the sliding; and
    applying pressure to the first bonding region and the second bonding region to form a solid adhesive bond between the replacement component and the second component.

14. The method of claim 13, further comprising first forming the plurality of bond standoffs by applying an uncured polymer to the first bonding region of the replacement component to define the pattern, followed by partial or full curing to form the plurality of bond standoffs.

15. The method of claim 14, wherein after the applying of the uncured polymer to the first bonding region, shaping the uncured polymer with a tool having a predetermined shape so as to form the plurality of bond standoffs.

16. The method of claim 13, further comprising first applying the uncured adhesive to the first bonding region of the replacement component; and leveling the applied uncured adhesive between the plurality of bond standoffs within the first bonding region.

17. The method of claim 13, wherein at least one of the replacement component or the second component comprises a polymeric composite material.

18. The method of claim 13, wherein the method further comprises first forming the plurality of bond standoffs by affixing bond standoffs on at least one of the replacement component or the second component so as to define the pattern configured to substantially retain the uncured adhesive during the sliding.

19. A method of forming an adhesive bond between automotive polymeric composite components, the method comprising:
    positioning a first bonding region of a first polymeric composite component adjacent to a second bonding region of a second polymeric composite component, wherein the first bonding region of the first polymeric composite component comprises an uncured adhesive and a plurality of bond standoffs that promote sliding between the first polymeric composite component and the second polymeric composite component, wherein the plurality of bond standoffs is compressible;
    laterally sliding the first polymeric composite component into engagement with the second polymeric composite component, so that the first bonding region contacts the second bonding region, wherein the plurality of bond standoffs defines a pattern configured to substantially retain the uncured adhesive during the sliding; and
    applying pressure to the first bonding region and the second bonding region to form a solid adhesive bond between the first polymeric composite component and the second polymeric composite component.

* * * * *